US007039671B2

(12) United States Patent
Cullen

(10) Patent No.: US 7,039,671 B2
(45) Date of Patent: May 2, 2006

(54) DYNAMICALLY ROUTING MESSAGES BETWEEN SOFTWARE APPLICATION PROGRAMS USING NAMED ROUTING NODES AND NAMED MESSAGE QUEUES

(75) Inventor: William Cullen, Cambridge, MA (US)

(73) Assignee: Sonic Software Corporation, Bedford, MA (US)

( * ) Notice: Subject to any disclaimer, the term of this patent is extended or adjusted under 35 U.S.C. 154(b) by 686 days.

(21) Appl. No.: 10/304,992

(22) Filed: Nov. 26, 2002

(65) Prior Publication Data

US 2003/0105800 A1 Jun. 5, 2003

Related U.S. Application Data

(60) Provisional application No. 60/336,044, filed on Nov. 30, 2001.

(51) Int. Cl.
*G06F 13/00* (2006.01)
*G06F 9/46* (2006.01)

(52) U.S. Cl. .................. 709/201; 709/206; 719/314

(58) Field of Classification Search ........ 709/200–206, 709/217–224; 719/313–315
See application file for complete search history.

(56) References Cited

U.S. PATENT DOCUMENTS

| 5,805,823 | A * | 9/1998 | Seitz .................... 709/236 |
| 6,434,605 | B1 * | 8/2002 | Faulkner et al. .......... 709/213 |
| 6,493,826 | B1 * | 12/2002 | Schofield et al. ........ 726/22 |
| 6,529,932 | B1 * | 3/2003 | Dadiomov et al. ........ 718/101 |
| 6,817,018 | B1 * | 11/2004 | Clarke et al. ............ 719/313 |
| 6,915,457 | B1 * | 7/2005 | Miller .................... 714/43 |

| 2002/0002613 | A1 | 1/2002 | Freeman et al. .......... 709/225 |
| 2002/0120717 | A1 | 8/2002 | Giotta .................... 709/219 |
| 2002/0124116 | A1 * | 9/2002 | Yaung ..................... 709/313 |
| 2002/0161839 | A1 | 10/2002 | Colasurdo et al. ........ 709/204 |

OTHER PUBLICATIONS

"Whitepaper: The Internet Goes Business Critical" taken from http://www-3.ibm.com/software/ts/moseries/library/whitepapers/internetbc/, printed on Oct. 21, 2002, pp. 1-10.
Progress Software "Using Messaging in Progress Applications- A Decision Landscape", copyright 2000, pp. 1-26.
Edwards, "Architecting e-business Solutions with IBM's Business Transformation & Integration Middleware", version 1.0 (Mar. 28, 2000), copyright IBM Corporation 2000, pp. 1-81.
Hapner et al., "Java Message Service", version 1.1, Apr. 12, 2002, copyright 2002 Sun Microsystems, Inc., pp. 1-139.

* cited by examiner

*Primary Examiner*—Moustafa M. Meky
(74) *Attorney, Agent, or Firm*—Foley Hoag LLP

(57) ABSTRACT

The disclosed technology enables electronic messages generated by one software application program to be routed to another remote software application program via a middleware oriented messaging ("MOM") infrastructure using named/labeled routing nodes and queues. Network connection information corresponding to particular routing nodes and queues can be automatically and dynamically determined by periodically, and/or upon the occurrence of an event, transmitting/receiving informational messages between software processes associated with known/previously-encountered routing nodes and queues. The routing nodes and queues can be identified by names or labels, which can be dynamically mapped to network connection information at runtime in the event of an addition, deletion, or modification to a processor cluster via the information contained in the informational messages.

30 Claims, 5 Drawing Sheets

DYNAMICALLY ROUTING MESSAGES BETWEEN SOFTWARE APPLICATION PROGRAMS USING NAMED ROUTING NODES AND NAMED MESSAGE QUEUES

RELATED APPLICATIONS

This claims priority to and the benefit of U.S. Provisional Patent Application No. 60/336,044, filed Nov. 30, 2001, the entirety of which is incorporated herein by reference.

TECHNICAL FIELD

The disclosed technology relates generally to electronic messaging and more particularly to dynamically routing messages between software application programs using named routing nodes and/or named message queues in a Message Oriented Middleware ("MOM") architecture.

BACKGROUND

Profit-seeking enterprises are constantly seeking ways of leveraging technological innovations to realize greater than average financial gains and to obtain competitive advantages over other industry participants. Technological innovations in the areas of electronic commerce ("e-commerce"), networking, and messaging are of particular interest to organizations involved in business-to-business ("B2B") and business-to-consumer ("B2C") transactions over the Internet in that such innovations enable organizations/entities to engage in electronic commerce with a larger pool of trading partners at a reduced cost and without experiencing significant time delays, being hampered by geographic separations/inaccessibility, and/or requiring fixed (i.e., non-mobile) network connections.

The integration and interoperability issues that would normally arise when developing a computing infrastructure that is sufficiently robust and flexible to support the high volume traffic and heterogeneous application programs and platforms of trading partners engaging in electronic commerce are partially mitigated through recent innovations in messaging middleware software. Messaging middleware enables disparate application programs and platforms to coexist and communicate without requiring trading partners to undertake complex and expensive development efforts or significant infrastructure upgrades. Accordingly, e-commerce participants and providers have a continuing interest in reducing costs/complexity and in enhancing messaging technologies to further streamline e-commerce into a series of seamless business transactions, without requiring such participants to have detailed knowledge of, or otherwise have to address, the underlying technology or infrastructure that enables this seamless interaction.

SUMMARY

The disclosed technology enables software application programs to communicate despite the disparity in the programs themselves and/or the heterogeneity in the platforms hosting such programs, without requiring a detailed understanding of the underlying technology by administrators or other users of such programs. The disclosed technology can be applied to a wide variety of business and technological problem areas, such as resolving integration issues associated with a single software application program, integrating internal software application programs and heterogeneous platforms that may be geographically dispersed, and developing a complex and geographically dispersed electronic marketplace that offers massive scalability, continuous availability, and advanced security features.

In one embodiment, the disclosed technology provides methods and systems that can dynamically route electronic messages between software application programs. The disclosed systems can include, without limitation, a first queue, a listener thread, a dispatcher thread, a routing table, and/or other processes and/or elements that can enable dynamic message routing.

A first queue can, for example, receive an electronic message from a first software application program. The electronic message can provide or otherwise identify a first routing node name and/or a first queue name that is associated with the first queue. A listener thread associated with the first routing node name can, for example, receive an informational message from one or more remotely-located software processes that can correspond to a previously-encountered routing node. The informational message can be transmitted in response to a request message that was transmitted to one or more remotely-located software processes for network connection information associated with a second queue. One or more of the remotely-located software processes can correspond to processes that were previously engaged in a messaging session with a routing node associated with the first routing node name.

The informational message can contain or otherwise identify network connection information (e.g., a default routing connection, an alternate routing connection, at least one network address associated with the second queue, and/or a routing path that can be used in routing at least part of the electronic message from the first to the second queue) that can be associated with a second routing node name and a second queue name. The second routing node name and second queue name can be associated with a second queue. The network connection information can also pertain to routing nodes that were previously encountered by one or more of the remotely-located software processes. The informational message can be periodically (e.g., upon expiration of a time period) transmitted by one or more remotely-located software processes. Alternatively or in combination, the informational message can be transmitted by one or more remotely-located software processes in response to an event corresponding to, for example, at least one of an addition, deletion, and/or modification of a routing node associated with the second routing node name.

A route table can be used to store at least some of the contents of the informational message. The contents of the route table can be initially determined by an initialization file and subsequently updated in response to one or more informational messages that can be received in response to a time period expiration and/or an event.

The second queue can reside on a digital data processing device that is different from the digital data processing device of the first queue and the operating systems on such processing devices can be either substantially identical or different. The digital data processing devices of the first queue and second queue can be in a common processor cluster or can be associated with different processing clusters (e.g., a first processor cluster and/or a second processor cluster). The contents of the second queue can be accessible by a second software application program.

A dispatcher thread can, for example, access at least part of the network connection information contained in the informational message to direct the formation of a network connection to the second queue. At least part of the electronic message can be routed from the first queue to the second queue via this network connection.

BRIEF DESCRIPTION OF THE DRAWINGS

The foregoing discussion will be understood more readily from the following detailed description of the disclosed technology, when taken in conjunction with the accompanying drawings in which.

DETAILED DESCRIPTION

Figure 1:
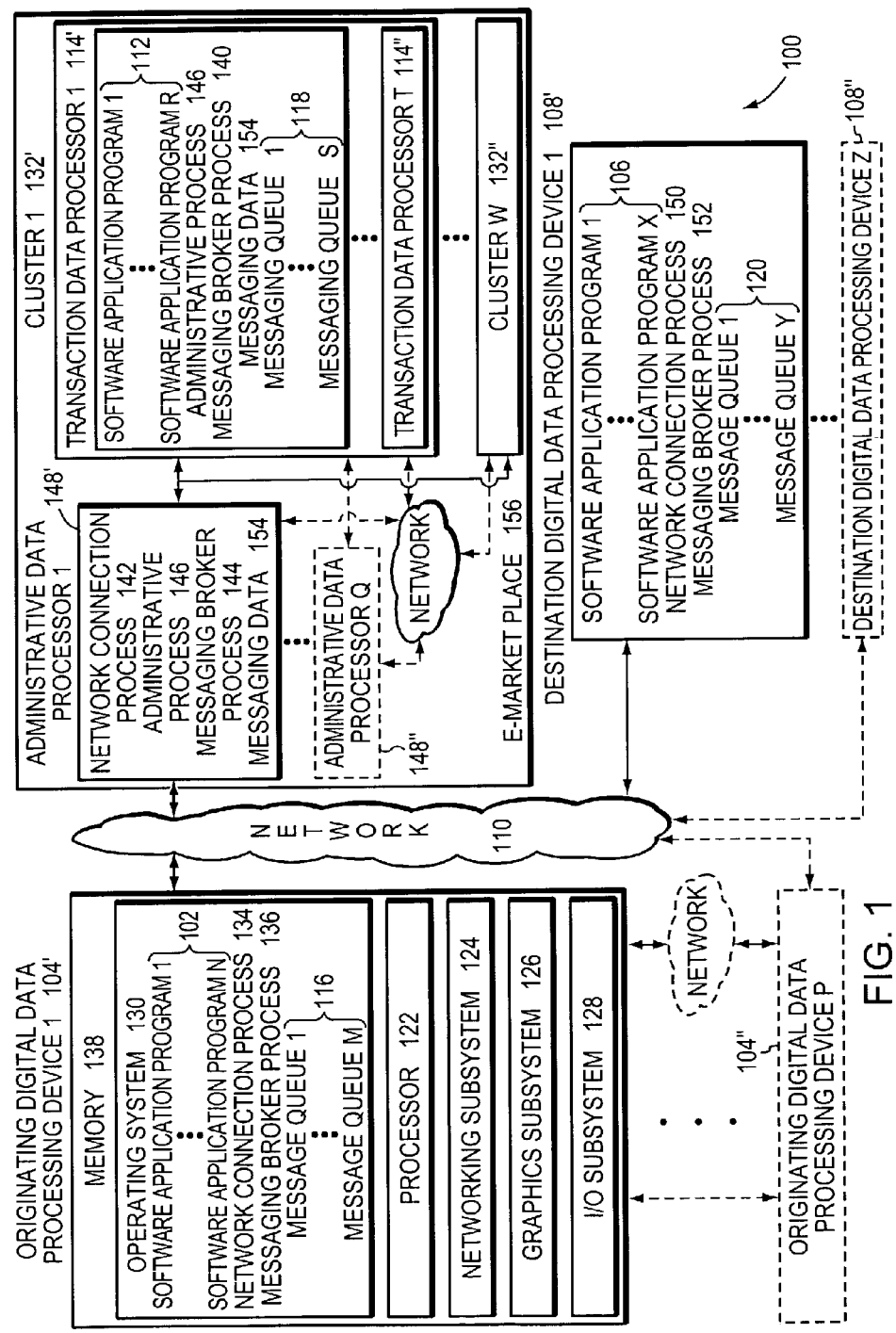
FIG. 1 schematically illustrates an exemplary messaging infrastructure suitable for using named queues to route messages between messaging participants.

Unless otherwise specified, the illustrated embodiments can be understood as providing exemplary features of varying detail of certain embodiments, and therefore, unless otherwise specified, features, components, processes, modules, data elements, and/or aspects of the illustrations can be otherwise combined, interconnected, sequenced, separated, interchanged, and/or rearranged without departing from the disclosed systems or methods. Additionally, the shapes and sizes of components are also exemplary and unless otherwise specified, can be altered without affecting the disclosed technology.

A computing infrastructure supporting electronic commerce and/or internal business processes may involve executing several software application programs that communicate via a messaging system based on, for example, a Message Oriented Middleware ("MOM") architecture. MOM refers to software that performs message-handling tasks that enable disparate software application programs to communicate without requiring user intervention to address the details of message-handling operations. MOM is characterized by a "loose coupling" of senders and recipients, in that the sender of a message need not know low-level details about the identity, location, or number of recipients of a message.

MOM architectures can employ one or more intermediary message processors to ensure message delivery even when the ultimate receivers of a message are unavailable at the time of its transmission. The loose coupling capability provided by MOM can be contrasted with Connection Oriented Middleware, which requires a software application program to have low-level details of the identity and network location of another message processor so that a connection can be established prior to exchanging data. In connection oriented systems, establishing a connection between a sending and receiving message processor often requires that both processors are available and responsive during the entire time that the connection is active.

Although software executing on the sending and receiving message processors (collectively referred to as clients) are loosely coupled when communicating via MOM and thus may not be available at the same time, intermediary message processors are normally required to communicate with these clients in a connection-oriented fashion. Accordingly, one or more intermediary message processors, exhibiting a relatively high availability, can ensure that a message is received from a sending client and/or that a message is delivered to a receiving client when a request for any such message is received. Furthermore, clients who may wish to exchange messages connect to the same intermediary message processor, or different intermediary message processors which are capable of working together in a connection-oriented fashion to achieve the equivalent functionality of a single intermediary message processor, i.e. to serve as a single logical intermediary message processor.

Although benefits can be realized when implementing MOM in a single intermediary message processor, MOM can also be implemented in one or more physical groups or clusters of intermediary message processors (configured, for example, as one or more logical intermediary message processors) to support many thousands of application programs without experiencing an appreciable degradation in performance. The disclosed technology recognizes that the numerous connections between message processors, the waste of available bandwidth during periods of infrequent inter-processor communications, and the security access restrictions of message processors impose significant administrative difficulties upon administrators of such clustered topologies. The administrative burden of these clustered topologies is further exacerbated when new message processors are added to the clusters and/or when the configuration of existing message processors are modified.

The disclosed technology addresses these administrative burdens by implementing a dynamic routing architecture that allows individual intermediary message processors and clusters of intermediary message processors to operate independently and to communicate and interoperate on an as-needed basis. The disclosed technology also enables named destinations to be reached by message senders regardless of connection and topology changes and thus reduces, if not eliminates, the need to reconfigure application code as intermediary messaging processors in a cluster are changed or scaled to higher volumes. Similarly, individual clusters can also be named so that message destinations within a cluster can be reached from other clusters.

In brief overview and with reference to FIG. 1, an entity desiring to originate a business transaction and/or to otherwise communicate with a destination entity via a MOM architecture 100 can execute one or more software application programs 102 (e.g., a purchasing application) residing on one or more originating digital data processing devices 104 to generate messages that are routed to one or more software application programs 106 (e.g., order fulfillment applications) of corresponding destination digital data processing devices 108. To benefit from the loose-coupling and asynchronous messaging features of MOM, the messages generated by the software application programs 102 on the originating digital data processing device 104 can be initially transmitted via a data communications network 110 to one or more software application programs 112 associated with one or more transaction digital data processing devices 114 (operating, for example, as intermediary message processors) where the messages can be processed, stored, and subsequently forwarded to the destination digital data processing devices 108. A message is defined broadly to refer to one or more data packets that can be generated by a software application program 102, 106, 112, which includes control information (such as a name or label associated with one or more queues 116, 118, 120 on the originating, destination, and/or transaction digital data processing devices 104, 114, 108, respectively) and payload data that includes, for example, data relevant to the underlying transaction (e.g., price quote).

A digital data processing device 104, 108, 114 can be a personal computer, computer workstation (e.g., Sun, HP), laptop computer, server computer, mainframe computer, handheld device (e.g., personal digital assistant, Pocket PC, cellular telephone, etc.), information appliance, or any other type of generic or special-purpose, processor-controlled device capable of receiving, processing, and/or transmitting digital data. A processor 122 refers to the logic circuitry that responds to and processes instructions (not shown) that drive digital data processing devices and can include, without limitation, a central processing unit, an arithmetic logic unit, an application specific integrated circuit, a task engine, and/or any combinations, arrangements, or multiples thereof. To reduce the complexity of FIG. 1, the processor 122, operating system 130, and any other subsystems 124–128 that may be present in a digital data processing device are shown as residing in the originating digital data processing device 104. Those skilled in the art will recognize that a processor, operating system, and all or at least some of these subsystems 124–128 may also be present in other digital data processing devices depicted in FIG. 1.

The instructions executed by a processor 122 represent, at a low level, a sequence of "0's" and "1's" that describe one or more physical operations of a digital data processing device. These instructions can be pre-loaded into a programmable memory (not shown) (e.g., EEPROM) that is accessible to the processor 122 and/or can be dynamically loaded into/from one or more volatile (e.g., RAM, cache, etc.) and/or non-volatile (e.g., hard drive, etc.) memory elements communicatively coupled to the processor 122. The instructions can, for example, correspond to the initialization of hardware within a digital data processing device, an operating system 130 that enables the hardware elements to communicate under software control and enables other computer programs to communicate, and/or software application programs 102, 106, 112 that are designed to perform particular functions for an entity (e.g., a trading partner) or other computer programs, such as functions relating to conducting electronic commerce or communicating between internal business processes. The operating system 130 can support either single-threading or multi-threading, where a thread refers to an independent stream of execution running in a multi-tasking environment. A single-threaded system is capable of executing one thread at a time. In contrast, a multi-threaded system is capable of supporting multiple concurrently executing threads and can thus perform multiple tasks simultaneously.

A local user (not shown) can interact with a digital data processing device by, for example, viewing a command line, graphical, and/or other user interface and entering commands via an input device, such as a mouse, keyboard, touch sensitive screen, track ball, keypad, etc. The user interface can be generated by a graphics subsystem 126 of a digital data processing device, which renders the interface into an on or off-screen surface (e.g., in a video memory and/or on a display screen). Inputs from the user can be received via an input/output subsystem 128 and routed to a processor 122 via an internal bus (not shown) (e.g., system bus) for execution under the control of the operating system 130.

Similarly, a remote user (not shown) can interact with a digital data processing device over a data communications network 110. The inputs from the remote user can be received and processed in whole or in part by a remote digital data processing device (not shown) collocated with the remote user 134. Alternatively or in combination, the inputs can be transmitted back to and processed by the local digital data processing device or to another digital data processing device via one or more networks using, for example, thin client technology. The user interface of the local digital data processing device can also be reproduced, in whole or in part, at the remote digital data processing device collocated with the remote user by transmitting graphics information to the remote device and instructing the graphics subsystem of the remote device to render and display at least part of the interface to the remote user. Network communications between two or more digital data processing devices typically require a network subsystem 124 (e.g., as embodied in a network interface card) to establish the communications link between the devices. The communications link interconnecting digital data processing devices can include elements of a data communications network, a point to point connection, a bus, and/or any other type of digital data path capable of conveying processor-readable data.

A data communications network 110 can comprise a series of network nodes (e.g., the originating, destination, and/or transaction digital data processing devices 104, 108, 114) that can be interconnected by network devices and communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from a source node to a destination node regardless of any dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes.

As discussed above, MOM architectures can be scaled to accommodate a number of messaging clients without appreciable performance degradations. Accordingly, one or more originating, destination, and/or transaction digital data processors 104, 108, 114 can be configured into a processor cluster (e.g., as shown in the transaction data processor cluster 132'). A plurality of digital data processors can also be configured into more than one cluster (e.g., clusters 132' and 132"), which can be interconnected with a digital data path as described above. The digital data processors within a cluster can be, but need not be, physically proximal. The digital data processors within a cluster can be homogeneous in that they operate under the control of a substantially identical operating system or the digital data processors can be heterogeneous in that at least some of the digital data processors operate under the control of different operating systems (e.g., one digital data processor can operate under Windows NT produced by the Microsoft Corp. of Redmond, Wash., while another operates under Unix).

In one embodiment, one or more processor clusters 132 can be implemented in accordance with a hub-and-spoke architecture, in which one or more network connection processes 134 and/or one or more messaging broker processes 136 executing in memories 138 of one or more originating digital data processing devices 104 communicate information contained in named queues 116 to/from at least one of the named queues 118 associated with a messaging broker process 140 of the transaction data processor 114 via a network connection process 142, a messaging broker process 144, and/or an administrative process 146 of an administrative digital data processing device 148. Similarly, one or more network connection processes 150 and/or one or more messaging broker processes 152 executing in memories of one or more destination digital data processing devices 108 communicate information contained in named queues 120 to/from at least one of the named queues 118 associated with the messaging broker process 140 of the transaction data processor 114 via a network connection process 142, a messaging broker process 144, and/or an administrative process 146 of the administrative digital data processing device 148. Those of ordinary skill will recognize that the use of the word "queue" as provided herein, should be understood to be an exemplary illustration of a list of associated items (e.g., messages associated with users, software application programs, processing transactions, sessions, etc.), and the use of the word "queue" should not be understood to be a limitation of a data structure that can be used to implement such association. Accordingly, such association can be performed using data structures such as queues, graphs, databases, tables, linked-lists, and other data structures, with such examples provided for illustration and not limitation.

A process generally refers to the execution of instructions that interact with operating parameters, message data/parameters, network connection parameters/data, variables, constants, software libraries, and/or any other elements needed for the proper execution of the instructions, within an execution environment in a memory of a digital data processing device, that causes a processor to control the operations of the data processing device in accordance with the desired functionality of an operating system, software application program, and/or any other type of generic or specific-purpose application program (or subparts thereof). For example, a network connection process 134, 142, 150 can refer to a set of instructions and other appropriate elements that enable a digital data processing device to establish a communication link and communicate with other digital data processing devices during one or more sessions. A session refers to a series of transactions (e.g., the transfer of messages to/from named queues 116, 118, 120) communicated between two network nodes during the span of a single network connection, where the session begins when the network connection is established and terminates when the connection is ended.

A messaging broker process 136, 140, 144, 152 can refer to a set of instructions and/or other appropriate elements that enable a digital data processing device to operate within a single or clustered MOM topology. The instructions of the messaging broker process 136, 140, 144, 152 can, for example, operate on or otherwise manipulate messaging data 154 (e.g., network connection data, named message queues, routing path information, hop and other reference counts, time-out counter, message location data, pointers to named message queues and buffers, named cluster and message queue information, load balancing data, resource utilization/availability information and other prioritized information relating to the selection of digital data processors, static data, dynamically changing runtime data, processor grouping and relationship information, access authorization and encryption information, network performance information, software application parameters/data, licensing information, status data, commands, and/or any other type of data desirable for the proper operation of the MOM architecture 100).

In one illustrative embodiment, a messaging broker process executing on a digital data processing device, which can be clustered with other messaging broker processes executing on other digital data processing devices or which can be executing on an unclustered digital data processing device, can be considered to be a routing node. A unique name or label (e.g., a Java string of unicode characters, or any other numerical, textual, or combination numerical/textual string, or other indicia) can be assigned to a messaging broker process to identify the routing node associated with that messaging broker process. Accordingly, messages communicated between messaging broker processes executing on one or more digital data processing devices can include at least one data packet with a packet header that can contain one or more routing node names and associated queue names for an originating, administrative, transaction, and/or destination digital data processing devices. Similarly, processor clusters can be assigned cluster names, thereby enabling routing node names with the same name, but different cluster names, to coexist and still be differentiated. In one embodiment, a single messaging broker process executes on and/or is otherwise associated with a single digital data processing device and/or a single processor cluster. In an embodiment, a single messaging broker process can be associated with more than one single digital data processing devices and/or processor clusters. In one embodiment, a messaging broker process can be associated with more than one routing node names where, for example, one or more corresponding routing nodes can be associated with different processor clusters and/or portals.

In one illustrative embodiment, a network connection process communicatively coupled to a messaging broker process and/or the messaging broker process itself determines network connection information pertaining to the cluster names, routing node names, and/or queue names specified by the messaging broker process by accessing, for example, a data structure that maps such names to indicia of previously-selected network addresses. In one embodiment, the previously-selected network addresses can be determined by an administrator and communicated to the data structure (which can be, for example, centrally located on a configuration server or distributed (partially or in its entirety) to one or more of the digital data processing devices associated with the messaging broker process). Alternatively or in combination, at least some, and in one embodiment all, messaging broker processes (e.g., those that are adjacent in a network) can communicate during periodic time intervals (e.g., every 15 minutes) and/or upon the occurrence of an event (e.g., a digital data processing device in a cluster is added, removed, or modified, etc.) by transmitting/receiving informational messages that specify cluster names, routing node names, queue names, network connection information, network hops, network paths, and/or other types of configuration information that enable the messaging broker processes to communicate, without requiring a user of such processes to manually determine and/or configure network connection parameters. The informational messages can enable messaging broker processes to obtain up-to-date configuration information about other messaging broker processes during runtime and to thereby dynamically and automatically reconfigure their operations to accommodate additions, deletions, and/or modifications to such messaging broker processes and/or associated hardware and software elements. The informational messages can also enable messaging brokers to identify routing/network paths between one or more messaging broker processes, by accessing, for example, network hop information contained in such messages.

An administrative process 146 can refer to a set of instructions and other appropriate elements that enable a digital data processing device to monitor, control, and/or otherwise administer a single or clustered MOM topology. For example, the administrative process 146 can a) maintain and update configuration, runtime, and/or session data for one or more of the transaction digital data processing devices 114 and/or originating and destination digital data processing devices 104, 108, b) provide buffer management, multi-threaded services, and/or data structure management, c) provide initialization parameters to at least some of the transaction digital data processing devices 114, d) manage groups of objects (e.g., groups of transaction, originating, and/or destination digital data processing devices 114, 104, 198; groups of software application programs 112; groups of users authorized to access software application programs 112; groups of transaction digital data processing devices 114 that host particular software application programs 112; groups of licenses, etc.), e) manage relationships between objects in response to messages communicated between one or more digital data processing devices 104, 108, 114, f) provide one or more common services (e.g., encryption/decryption, path routing, message parsing, message format manipulation to, for example, conform a message format to a compatible format) to the transaction digital data processing devices 114, and/or g) provide load balancing based on, for example, processor usage/availability, network usage/availability, memory usage/availability, software application program usage/availability, message length, and/or message volume. Those skilled in the art will recognize that, although the various processes and their functionality have been described with respect to particular embodiments, these processes and/or their functionality can be combined into a single process or into any combination of multiple processes. The processes can also be provided using a combination of built-in functions of one or more commercially-available software application programs and/or in combination with one or more custom-designed software modules.

In one embodiment, one or more processor clusters 132 can be implemented in accordance with a bus architecture, in which at least some of the transaction digital data processing devices 114 provide at least some of the functionality discussed above with respect to the administrative process 146, without having a separate administrative digital data processing device 148 to support such functions. Messages transmitted to the processor cluster 132 from one or more originating and/or destination digital data processing devices 104, 108 can be received by one or more transaction digital data processing devices 114 based on election criteria, which can be based on, for example, load balancing/performance metrics associated with such transaction digital data processing devices 114. A message received by an elected transaction digital data processing device 114 can be analyzed and subsequently forwarded to one or more other transaction digital data processing devices that host relevant software application programs 112 to perform desired functions.

In one illustrative embodiment, the administrative digital data processing devices 148 and processor clusters 132 can be configured to operate as an electronic marketplace 156, also known as a portal, in which, for example, a messaging broker process 136 (intending to, for example, purchase a widget) embedded in or otherwise interacting with a web browser application program and executing on the originating digital data processing device 104, transmits an encrypted XML message using a secure socket layer connection to a web server application program executing on an administrative digital data processing device 148, which subsequently routes at least part of the received message to a messaging broker process 140 associated with one or more transaction digital data processing devices 114 (where, for example, qualified/participating suppliers of the widget can be determined). After a transaction digital data processing device 114 processes the message, it can route a responsive message to a messaging broker process 152 (corresponding to, for example, a supplier of the widget that can subsequently confirm/commit to providing the widget to a user of the originating digital data processing device 104 that requested it at a particular price) associated with one or more destination digital data processing devices 108 directly or via the web server application program of the administrative data processor 148.

Figure 2A:
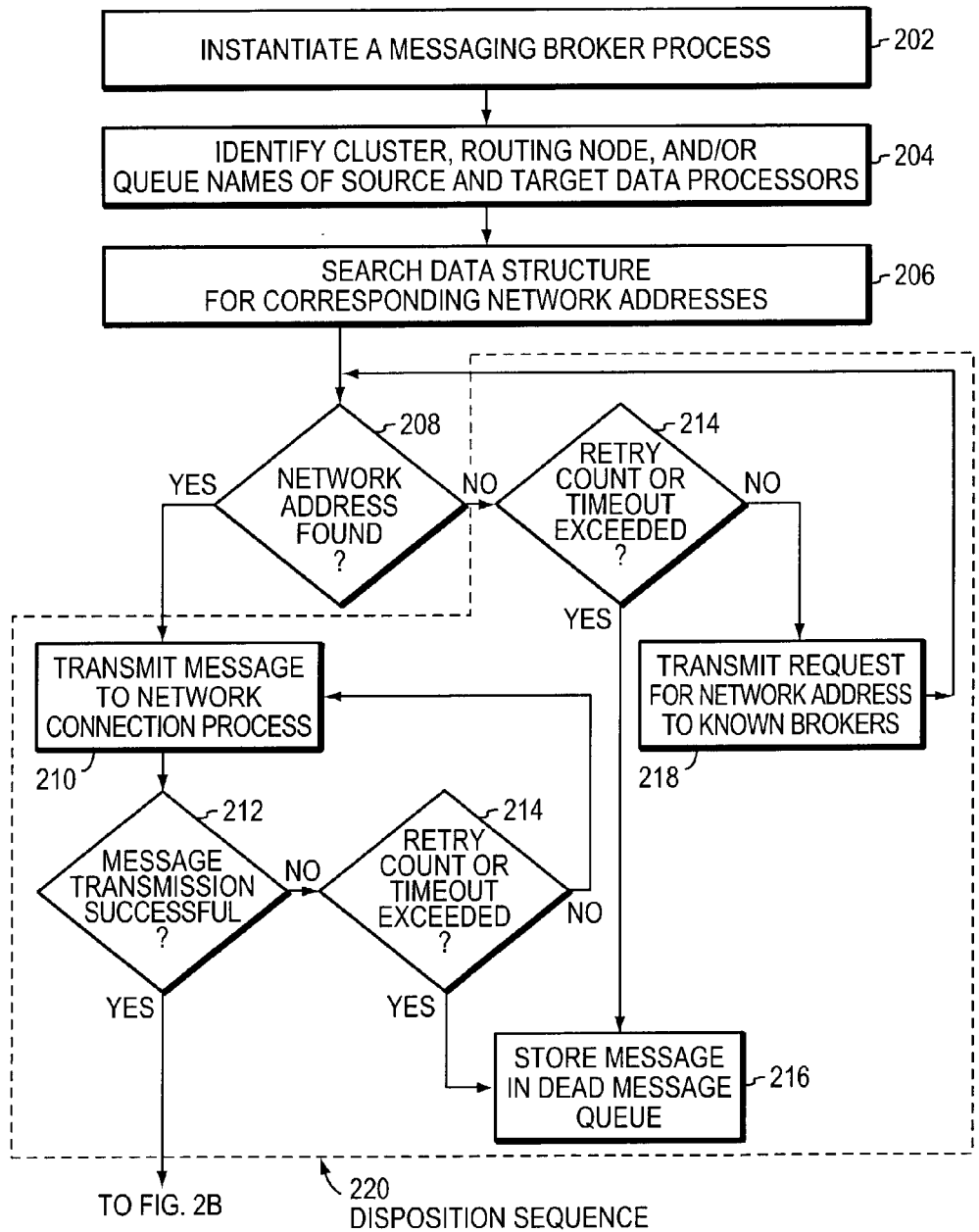
FIG. 2A illustrates an exemplary methodology performed by a messaging broker process of an originating digital data processing device in the messaging infrastructure of FIG. 1.

In one illustrative operation and with reference to FIGS. 1 and 2A, a software application program 102, executing on the originating digital data processing device 104, that desires to initiate a transaction with an electronic marketplace 156 can search for the presence of a messaging broker process 136 that is capable of supporting such transactions. If the software application program 102 is unable to locate an available messaging broker process 136, the application program 102 can execute instructions to instantiate the messaging broker process 136 (202). Once the messaging broker process 136 is executing, it can receive particular details of the desired transaction (e.g., desired quantity of a particular item, identifier of the item, shipping destination information, payment/credit information, etc.) from the software application program 102 (204), which can be reflected in the data packet that is transmitted to the electronic marketplace 156. The portal, cluster, routing node and/or queue names associated with the messaging broker process 136 and message queues 116 of the originating digital data processing device 104 can be determined by accessing configuration or initialization information during and/or after initialization of the software application programs 102 and/or messaging broker process 136 (e.g. by accessing a data structure of such information, which can be provided statically by an administrator and/or dynamically and automatically via the informational messages transmitted between messaging broker processes during runtime, as previously described). The cluster, routing node, and/or queue names associated with the target administrative and/or transaction digital data processing devices 148, 114 can be ascertained in a similar fashion.

The software application program 102 can also execute instructions that form one or more named queues in a memory 138 of the originating digital data processing device 104 (if any such queues do not already exist or that do exist but are otherwise unavailable) that may be useful in supporting the desired transaction. For example, the named queues can include one or more input queues (named, for example, InQ) that can receive messages pertaining to the desired transaction, temporary queues (named, for example, TmpQ) that can receive transient/nonpersistent reply messages, application queues (named, for example, AppQ) that can receive messages requiring further processing by one or more of the software application programs 102 of the originating digital data processing device 104 (may occur, for example, if the desired transaction requires a plurality of communications during a session with the portal and/or destination digital data processing device 108), and/or dead message queues (named, for example, DeadMsgQ) that can store unsuccessfully transmitted messages. These named queues can be defined as a) global, in which case they can be accessed by remote processes, b) restricted global, in which case they can be accessed by a subset of authorized, remote processes (e.g., a subset of messaging broker processes in a cluster), or c) local, in which case they may restrictively be accessed by locally-executing processes. Those skilled in the art will recognize that at least some of the functionality of the software application programs 102 that pertains to the identification of cluster, routing node and queue names (204) and the formation of corresponding named queues can be performed directly by and/or performed under the control of one or more messaging broker processes 136.

The messaging broker process 136 can search a data structure to identify one or more network addresses associated with the cluster, routing node and/or queue names of the source originating digital data processing device 104 and/or target administrative and/or transaction digital data processing devices 148, 114 (206). These network addresses can be stored in configuration files, initialization files, or in any data structure that can be accessed by the messaging broker process 136. In one embodiment, the network addresses associated with the target administrative and/or transaction digital data processing devices 148, 114 can be stored as one or more URLs (universal resource locators) within a configuration file associated with a web browser application executing on the originating digital data processing device 104.

In response to the search for relevant network addresses, the messaging broker process 136 can receive a message, interrupt, or other indicator that enables the messaging broker process 136 to determine whether or not the network address has been found (208). If at least one network address for the target administrative and/or transaction digital data processing devices 148, 114 is located, the messaging broker process 136 can either directly provide or instruct another process to provide the network address, cluster name, routing node name, queue name, and related transaction details to the network connection process 134. The network connection process 134 can compress, encrypt, encode and/or otherwise manipulate such parameters to form a data packet that can be transmitted to one or more network connection processes 142 associated with the target administrative and/or transaction digital data processing devices 148, 114 (210).

The source network connection process 134 can receive an indication back from the target network connection process 142 indicating whether the transmission of the message was successful (212). If the transmission of the message was not successful, the network connection process 134 and/or the messaging broker process 136 can access a counter indicating whether a predefined number of retry attempts and/or whether a timeout period has been exceeded (214). If the retry counter and/or timeout period has not been exceeded, the network connection process 134 can re-transmit the message to the target network connection process 142. If the retry counter and/or timeout period has been exceeded, the software application program 102 that initiated the transaction can be informed and/or the message can be stored in a dead message queue (216) where it can, for example, be retransmitted using alternative messaging or transmission technologies, retained for a predetermined time period (based on, for example, an expiration time period embedded in the message itself, an administratively determined time period, and/or upon reaching a predetermined size in the dead message queue.

If the messaging broker process 136 fails to locate a network address associated with the target administrative and/or transaction digital data processing devices 148, 114, the messaging broker process 136 can re-attempt to find such network address (or alternative network addresses) until a retry count and/or timeout period has been exceeded. In one embodiment, upon failing to locate a viable network address, the messaging broker process 136 can instruct the network connection process 134 to transmit an informational message to one or more different messaging broker processes that are adjacent to and/or have previously been involved in messaging sessions with the messaging broker process 136 of the originating digital data processing device 104, where the informational message can contain a request for a viable network address associated with the target administrative and/or transaction digital data processing devices 148, 114 (218). The request can also request network routing information, such as the number of messaging broker processes and/or other network connections or hops that may be traversed in transmitting the message, that can be useful in dynamically determining and selecting a routing path. The messaging broker process 136 of the originating digital data processing device 104 can receive responsive messages to the informational message it transmitted and can attempt to retransmit the original message to one or more network addresses identified in such responsive messages using the routing path until a retry count and/or timeout period has been exceeded.

Figure 2B:
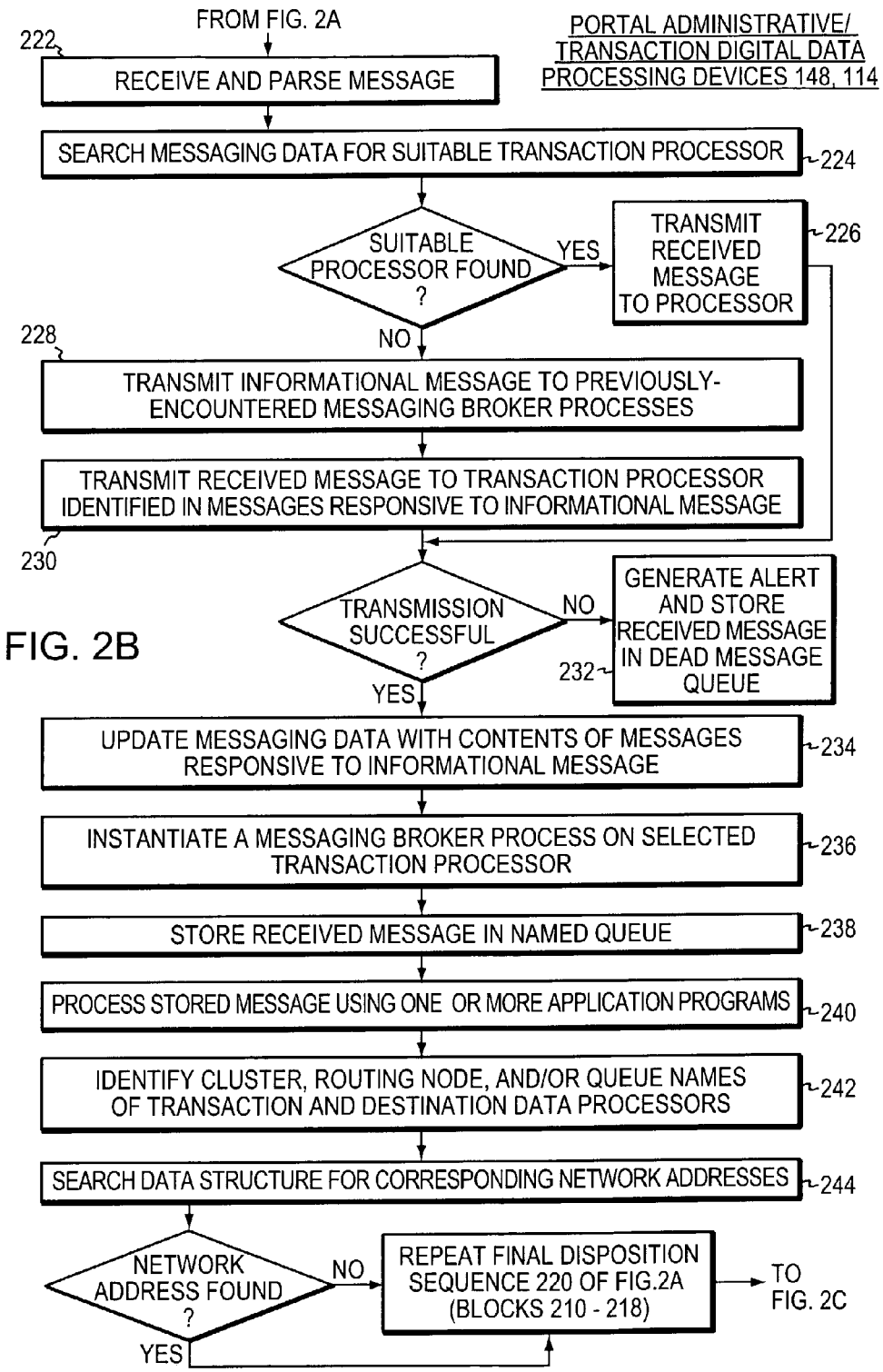
FIG. 2B illustrates an exemplary methodology performed by a messaging broker process of an administrative and/or transaction digital data processing device in the messaging infrastructure of FIG. 1.

With reference now also to FIG. 2B, a message that is successfully transmitted by the network connection process 134 of the originating digital data processing device 104 is received and parsed by the target network connection process 146 associated with the target administrative and/or transaction digital data processing devices 148, 114 to identify a suitable transaction digital data processing device 114 hosting a software application program 112 suitable for performing the transaction specified in the received message and/or to identify the target messaging broker process 140, 144 and message queue 118 corresponding to the cluster, routing node, and/or queue name specified in the received message (222). Those skilled in the art will recognize that the processes, data, and functions performed by the administrative digital data processing device 148 can be performed by one or more of the transaction digital data processing devices 114 depending on the particular MOM architecture (e.g., hub-and-spoke, bus, etc.) implemented. Accordingly and for clarity purposes, the following description will describe a hub-and-spoke architecture that implements a distinct administrative digital data processing device 148, whose functionality can find substantially equivalent implementation in bus or other types of MOM architectures.

A messaging broker process 144 and/or administrative process 146 executing on the administrative digital data processing device 148 can search messaging data 154 residing on the administrative digital data processing device 148, on one or more transaction digital data processing devices 114, and/or on any other processor-accessible data repository to identify (based on, for example, load balancing metrics and/or number of network hops) a transaction digital data processing device 114 (including, for example, its associated cluster name, routing node name of resident messaging broker processes, queue names, and/or network addresses) capable of executing a software application program 112 that is suitable for processing the message received from the originating digital data processing device 104 (224).

If a suitable transaction digital data processing device 114 is identified, the administrative process 146 and/or messaging broker process 144 of the administrative digital data processing device 148 can instruct the network connection process 146 to transmit the received message to a messaging broker process 140 of the selected transaction digital data processing device 114 (226). If a suitable transaction digital data processing device 114 is not identified, the administrative process 146 and/or messaging broker process 144 of the administrative digital data processing device 148 can instruct the network connection process 146 to transmit informational messages to one or more adjacent and/or different messaging broker processes, of which they are aware and/or have previously communicated with in prior message sessions to request the network addresses and/or associated cluster, routing node, and queue names associated with a suitable transaction digital data processing device 114 (228). The informational message can also request network routing information (e.g., number of network hops, etc.) useful in selecting a path to a suitable transaction digital data processing device. The administrative process 146 and/or messaging broker process 144 can subsequently receive responsive messages to the informational message and can attempt to transmit the message received from the originating digital data processing device 104 to one or more network addresses identified in such responsive messages until a retry count and/or timeout period has been exceeded (230). If the message is not successfully transmitted to the identified network addresses, then an alert message or indicator can be generated and the message can be transferred to a dead message queue for disposition (232). If the message is successfully transmitted to the identified network addresses, the network addresses, cluster names, routing node names, queue names, routing/network path, and other related information contained in the responsive messages can be added to the messaging data 154 on the administrative and/or transaction digital data processing devices 148, 114 and/or to any other data structure maintained by and/or accessible to one or more messaging broker processes, regardless of their participation or nonparticipation in the message exchange (234). Those skilled in the art will recognize that the search sequence for particular network addresses can initially begin by transmitting such informational messages and subsequently searching stored messaging data 154 rather than the opposite sequence described above.

In one embodiment, the administrative process 146 and/or messaging broker processes 144, 140 of the administrative and/or transaction digital data processing devices 148, 114 can periodically and/or upon the occurrence of an event (e.g., initialization of a digital data processing device, addition/deletion/replacement/modification of digital data processing devices in one or more clusters 132 associated with the electronic marketplace, and/or receiving instructions from an administrator, user, and/or subscriber of the electronic marketplace) transmit informational messages to adjacent or otherwise known/previously-encountered messaging broker processes to obtain and/or disseminate current routing and naming information (e.g., network addresses, network hops, routing/network paths, cluster names, routing node names, queue names, hosted software application programs, etc.) associated with messaging broker processes, queues, digital data processing devices, software application programs, etc., for which one or more sessions have been effectuated, and thus maintain the messaging data 154 up-to-date.

Upon receipt of the message originally transmitted from the originating digital data processing device 104 and subsequently routed by the administrative process 146 and/or messaging broker processes 144, 140 of the administrative and/or transaction digital data processing devices 148, an administrative process 146 or other process executing on the selected transaction digital data processing device can, if necessary, instantiate a messaging broker process, one or more messaging queues, and/or one or more software application programs (236). The messaging broker process of the selected transaction digital data processing device can receive and store the routed message in a named queue (e.g., in an application queue) (238). A software application program executing on the selected transaction digital data processing device can access the stored message from the named queue and decrypt, decode, and/or otherwise manipulate and process the message to perform the desired transaction (e.g., to identify and select a number of suppliers capable of providing the particular items requested by the software application program 102 of the originating digital data processing device 104) (240).

The messaging broker process can identify the cluster, routing node and/or queue names associated with the messaging broker processes of the selected transaction digital data processing device and a destination digital data processing device 108 by, for example, accessing a configuration file, initialization file, messaging data, the contents of an informational message, and/or any other processor-accessible data structure (242).

The messaging broker process of the selected transaction digital data processing device can search a data structure to identify one or more network addresses associated with the cluster, routing node and/or queue names of a destination digital data processing device 108 (244). These network addresses can be stored in configuration files, initialization files, messaging data, informational messages, or in any data structure that can be accessed by the messaging broker process. The disposition sequence 220 illustrated and discussed above with respect to FIG. 2A (blocks 210–218) can be followed to address situations where a suitable network address has or has not been located. If at least one network address for the destination digital data processing devices 108 is located, the messaging broker process can either directly provide or instruct another process to provide the network address, cluster name, routing node name, queue name, routing/network path, and related transaction details to a network connection process, which can compress, encrypt, encode and/or otherwise manipulate such parameters to form a data packet that can be transmitted to one or more network connection processes 150 associated with the destination digital data processing device 108.

Figure 2C:
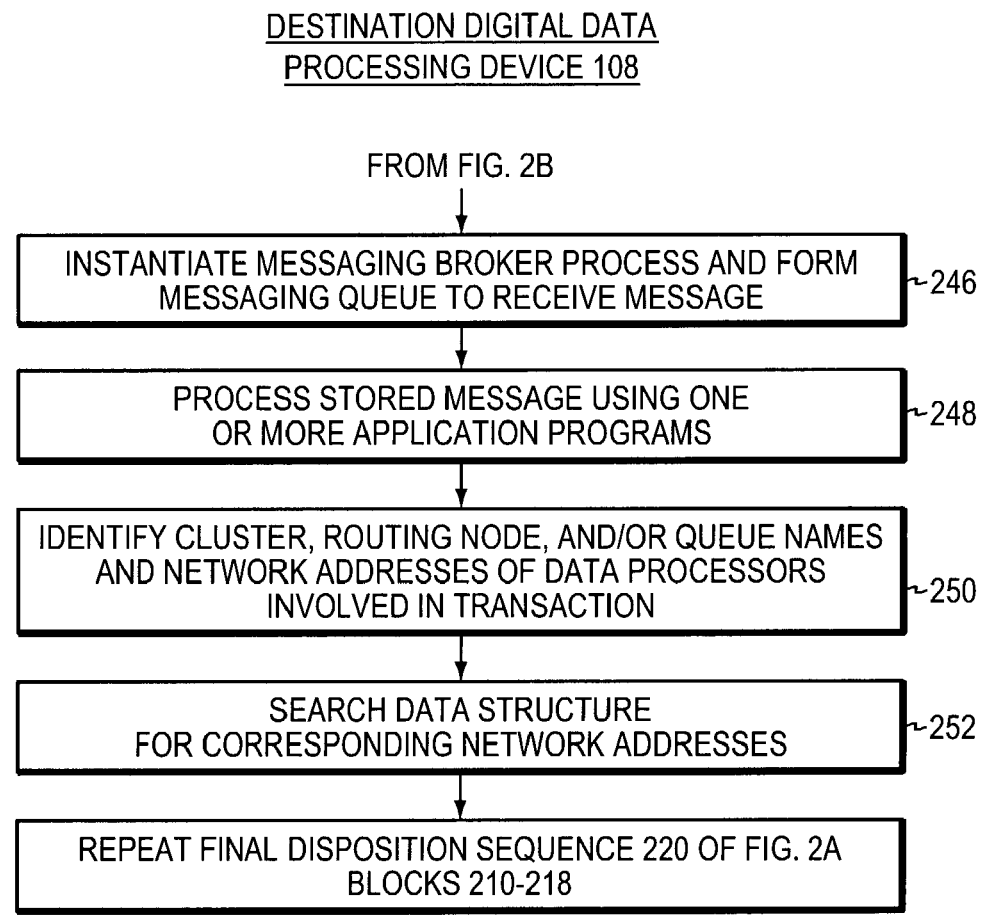
FIG. 2C illustrates an exemplary methodology performed by a messaging broker process of a destination digital data processing device in the messaging infrastructure of FIG. 1.

With reference to FIG. 2C and assuming that a message formed by the messaging broker process of the selected transaction digital data processing device has been successfully transmitted to and received by the network connection process 150 of the destination digital data processing device 108, a messaging broker process 152 along with related messaging queues 120 can be instantiated, if necessary, to receive and store the message in a named queue (e.g., InQ) (246). A software application program 106 executing on the destination digital data processing device 108 can access the stored message from the named queue and decrypt, decode, and/or otherwise manipulate and process the message to perform the desired transaction (e.g., to provide pricing information and/or shipping information for a particular item) (248).

The messaging broker process 152 can identify the cluster, routing node, queue names, and/or network addresses associated with the messaging broker processes of the selected transaction digital data processing device, originating digital data processing device 104 and/or destination digital data processing device 108 by, for example, accessing a configuration file, initialization file, messaging data, informational message, and/or any other processor-accessible data structure (250). The messaging broker process 152 of the destination digital data processing device 108 can determine the network addresses of the digital data processing devices involved in the transaction from the message stored in the named message queue 120 and/or by searching the aforementioned processor-accessible data structure (252). The disposition sequence 220 illustrated and discussed above with respect to FIG. 2A (blocks 210–218) can be followed to address situations where a desired network address has or has not been located. If at least one network address for the originating, administrative, and/or transaction digital data processing devices 104, 148, 114 is located, the messaging broker process 152 can either directly provide or instruct another process to provide the network address, cluster name, routing node name, queue name, routing/network path, and related transaction details to a network connection process 150, which can compress, encrypt, encode and/or otherwise manipulate such parameters to form a data packet that can be transmitted to one or more network connection processes associated with such digital data processing devices 104, 148, 114.

The methodology described above in connection with FIGS. 2A–C can be substantially repeated for a plurality of transaction messages in a single session between two trading/business partners, as well as, for a plurality of sessions involving potentially numerous trading partners and/or other entities. As described above, the disclosed technology can scale seamlessly, automatically and dynamically without requiring human interaction to address additions; deletions, and/or modifications to a messaging infrastructure.

Figure 3:
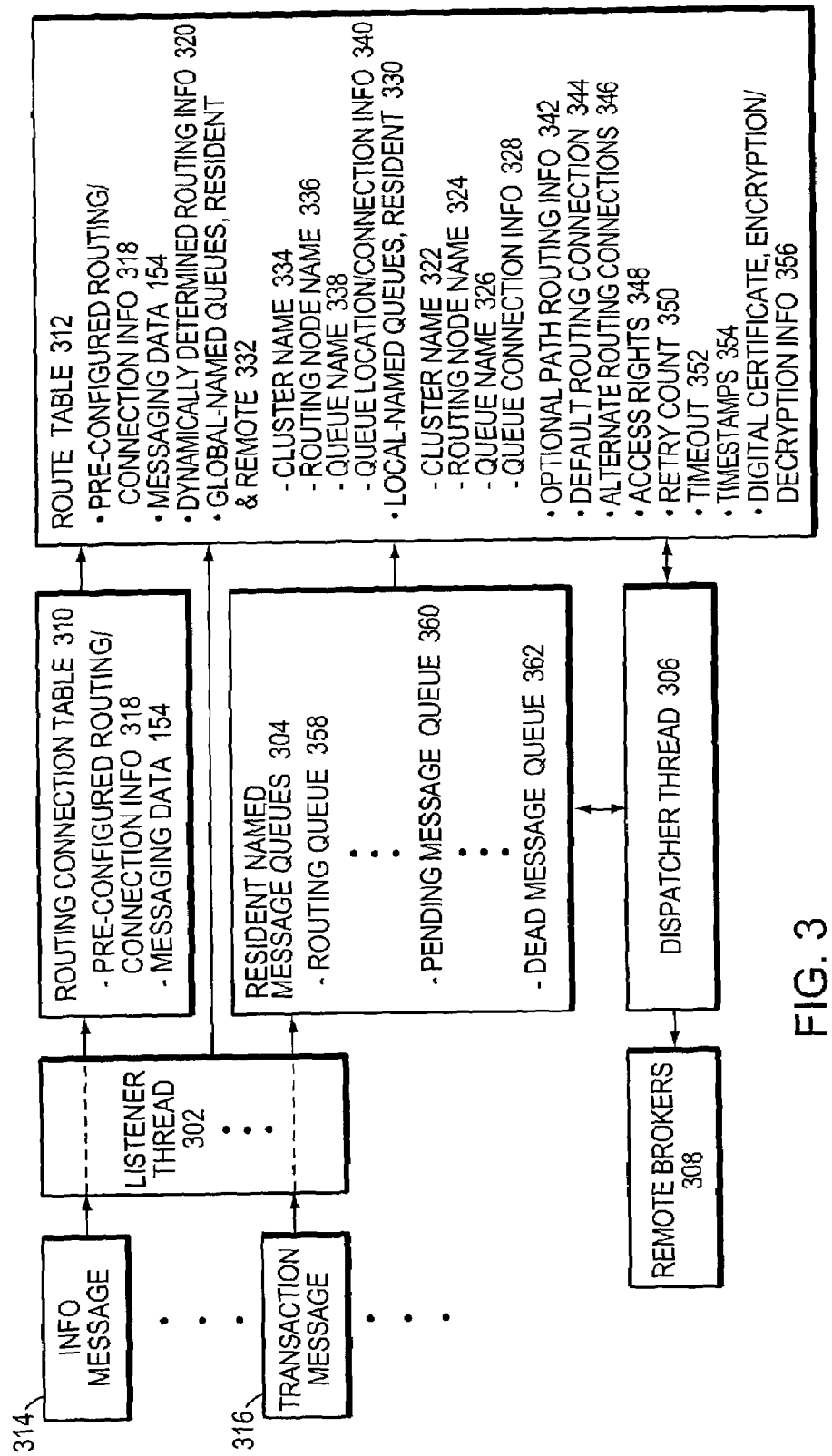
FIG. 3 schematically illustrates exemplary processes associated with a messaging broker process along with exemplary data structures and data that can be manipulated within an execution environment of the messaging broker process.

With reference to FIG. 3, an illustrative embodiment of a messaging broker process can include one or more of the following: a listener thread 302, a dispatcher thread 306, and/or a remote broker object 308. An execution environment supporting the execution of the messaging broker process can also include one or more named message queues 304 that can reside on a digital data processing device associated with the messaging broker process, one or more routing connection tables 310, and/or one or more route tables 312. Those skilled in the art will recognize that the listener thread 302, dispatcher thread 306, and remote broker object 308 can correspond to a software process or element executing within a memory of a digital data processing device. Those skilled in the art will also recognize that the routing connection table 310 and route table 312 can correspond to a data structure and that the named queues 304 can correspond to a type or quantity of memory elements capable of being associated and/or identified by a name and/or other label.

One or more listener threads 302 can detect and parse incoming informational messages 314 and/or transaction messages 316 and forward them to at least one of the routing connection table 310, route table 312, and resident named message queues 304. For example, an informational message 314 that is formed and transmitted to the messaging broker process by an administrator, administrative process, and/or via any other management system/tool, can be detected by the listener thread 302, which forwards the message contents to the routing connection table 310 so as to provide new and/or updated messaging data 154 and/or other pre-configured routing/connection information 318 (e.g., network addresses of digital data processing devices 114 within one or more clusters 132 supporting a MOM infrastructure of an electronic marketplace 156 and/or network addresses corresponding to digital data processing devices 104, 108 subscribing to at least one service of the electronic marketplace 156). The contents 154, 318 of the routing connection table 310 can then be used to update corresponding information in the route table 312, based on, for example, a timestamp and/or version number that identifies whether the information from the routing connection table 310 is more recent than that of the route table 312. The contents of the administratively-determined informational message can also be provided by accessing an initialization and/or configuration file associated with the messaging broker process. Similarly, the contents of an informational message 314 transmitted by another messaging broker process can be detected and directly forwarded by the listener thread 302 to the route table 312. This message content can correspond to automatically and dynamically-determined routing information 320 that can be conveyed by other messaging broker processes periodically and/or upon the occurrence of a particular event (e.g., an addition, deletion, and/or modification of a messaging broker process and/or its associated digital data processing device).

At least part of the contents of the route table 312 (except perhaps local information, such as the cluster name 322, routing node name 324, queue name 326, queue connection information 328 and/or other information associated with one or more named queues 330 that have been designated as local or restricted global and which may reside on a local digital data processing device) can be incorporated into an outgoing informational message and communicated to one or more remotely-located messaging broker processes. An exemplary listing of the contents of a route table 312 includes: pre-configured routing/connection information 318, messaging data 154, dynamically-determined routing information 320, references (e.g., pointers) to local-designated named queues 330 and related routing/connection information 322–328, references (e.g., pointers) to global-designated named queues 332 (and related cluster name 334, routing node name 336, queue name 338, queue connection information 340) that can be stored locally and/or remotely, path routing information 342 (e.g., number of hops between messaging broker processes, shortest sequence of messaging broker processes and corresponding digital data processing devices to traverse), default routing connection information 344 that can be used as the primary connection to a particular messaging broker of interest, alternate routing connection information 346 that can be used if the default routing connection is not available, access rights 348 for users, retry counts 350, timeout periods 352, timestamps 354, digital certificate/encryption/decryption information 356, and/or any other type of information useful in managing, controlling, and otherwise operating the disclosed messaging technology.

As disclosed above, one or more listener threads 302 can also detect and parse transaction messages 316 that can contain, for example, information pertaining to an underlying business/commercial transaction. A listener thread 302 can forward the parsed transaction message to a routing queue 358 associated with a particular name specified in the transaction message 316. A dispatcher thread 306 can dequeue the message forwarded to the routing queue 358 and search the route table 312 for network connection data associated with one or more software application programs and/or destination cluster, routing node, and/or queue names specified in the dequeued message. At least some of the data contained in the message 316 can also be forwarded to the route table 312 where it can be maintained in a persistent and/or a volatile memory. If network connection data is found, the dispatcher thread 306 can instruct a remote broker 308 (or first instantiate such broker if one is not active), such as a proxy object, to form and maintain a connection to the destination routing node specified in the transaction message 316. Once a connection is established, the remote broker 308 can forward the message and monitor its transmission and receipt to ensure, for example, its guaranteed delivery. If a connection can not be established or maintained, the message can be forwarded to a pending message queue 360 and the disposition sequence of FIG. 2A can be performed until the message is successfully transmitted or if unsuccessful, following a retry/timeout period, forwarded to a dead message queue 362. If network connection information is not found, then the messaging broker process can similarly repeat the disposition sequence of FIG. 2A as previously described.

The performance of messaging infrastructures underpinning an electronic marketplace can depend on a number of factors, including, for example, the number of subscribing users, the availability of computing and networking resources, the frequency of interaction, the complexity of business transactions, and on the overall messaging volume handled by the infrastructure. Accordingly, the disclosed technology can optimize the routing processes described above by, for example, applying different encoding/compression techniques based on network performance metrics, adjusting a processing rate of a digital data processing device based on network performance metrics, limiting transaction types to a predefined set of authorized transactions (corresponding to, for example, a list of codes) and thereby reducing the size of the packet body, and/or leveraging off of a similar transaction and/or message that may have been previously processed and stored in a volatile or nonvolatile memory of a transaction data processor so that only an identifier of the previously-processed message need be transmitted to the transaction data processor, which can then locate a locally-stored copy of the previous message and reinitiate its execution, thereby avoiding the retransmission of such message.

Although the disclosed technology has been described with reference to specific embodiments, it is not intended that such details should be regarded as limitations upon the scope of the invention, except as and to the extent that they are included in the accompanying claims.

The invention claimed is:

1. A method of dynamically routing electronic messages between software application programs, the method comprising:
   receiving an electronic message from a first software application program, the electronic message including a first routing node name and a first queue name associated with a first queue for receiving the electronic message;
   receiving an informational message from at least one of a plurality of remotely-located software processes, the informational message containing network connection information associated with a second routing node name and a second queue name associated with a second queue, the contents of the second queue being accessible by a second software application program; and
   routing at least part of the electronic message from the first queue to the second queue using the network connection information contained in the informational message.

2. The method of claim 1 wherein the network connection information includes at least one network address associated with the second queue.

3. The method of claim 1 wherein the network connection information identifies a routing path used in routing at least part of the electronic message from the first queue to the second queue.

4. The method of claim 1 wherein the remotely-located software process providing the informational message corresponds to a previously-encountered routing node.

5. The method of claim 1 wherein the network connection information includes a default routing connection and an alternate routing connection.

6. The method of claim 1 wherein the first and second queues reside on different digital data processing devices with different operating systems.

7. The method of claim 1 wherein the first and second queues reside on different digital data processing devices with substantially identical operating systems.

8. The method of claim 1 wherein the first and second queues reside on different digital data processing devices in a common processor cluster.

9. The method of claim 1 wherein the first queue resides on a digital data processing device associated with a first processor cluster and the second queue resides on a different digital data processing device associated with a second processor cluster.

10. The method of claim 1 wherein the informational message is periodically transmitted by at least one of the plurality of remotely-located software processes.

11. The method of claim 1 wherein the informational message is transmitted by at least one of the plurality of remotely-located software processes in response to an event.

12. The method of claim 11 wherein the event corresponds to at least one of an addition, deletion, and modification of a routing node associated with the second routing node name.

13. The method of claim 1 wherein the informational message contains network connection information for routing nodes previously encountered by at least one of the plurality of remotely-located software processes.

14. The method of claim 1 further comprising:
   transmitting a request message for network connection information associated with the second queue to the plurality of remotely-located software processes.

15. The method of claim 14 wherein the plurality of remotely-located software processes correspond to processes previously engaged in a messaging session with a routing node associated with the first routing node name.

16. A system for dynamically routing electronic messages between software application programs, the system comprising:
   a first queue receiving an electronic message from a first software application program, the electronic message identifying a first routing node name and a first queue name associated with the first queue;
   a listener thread associated with the first routing node name and receiving an informational message from at least one of a plurality of remotely-located software processes, the informational message containing network connection information associated with a second routing node name and a second queue name associated with a second queue, the contents of the second queue being accessible by a second software application program; and a dispatcher thread accessing at least part of the network connection information contained in the informational message to direct the formation of a network connection to the second queue, wherein at least part of the electronic message from the first queue is routed to the second queue via the network connection.

17. The system of claim 16 wherein the network connection information includes at least one network address associated with the second queue.

18. The system of claim 16 wherein the network connection information identifies a routing path used in routing at least part of the electronic message from the first queue to the second queue.

19. The system of claim 16 wherein the remotely-located software process providing the informational message corresponds to a previously-encountered routing node.

20. The system of claim 16 wherein the network connection information includes a default routing connection and an alternate routing connection.

21. The system of claim 16 wherein the first and second queues reside on different digital data processing devices with different operating systems.

22. The system of claim 16 wherein the first and second queues reside on different digital data processing devices with substantially identical operating systems.

23. The system of claim 16 wherein the first and second queues reside on different digital data processing devices in a common processor cluster.

24. The system of claim 16 wherein the first queue resides on a digital data processing device associated with a first processor cluster and the second queue resides on a different digital data processing device associated with a second processor cluster.

25. The system of claim 16 wherein the informational message is periodically transmitted by at least one of the plurality of remotely-located software processes.

26. The system of claim 16 wherein the informational message is transmitted by at least one of the plurality of remotely-located software processes in response to an event.

27. The system of claim 26 wherein the event corresponds to at least one of an addition, deletion, and modification of a routing node associated with the second routing node name.

28. The system of claim 16 wherein the informational message contains network connection information for routing nodes previously encountered by at least one of the plurality of remotely-located software processes.

29. The system of claim 16 wherein the plurality of remotely-located software processes correspond to processes previously engaged in a messaging session with a routing node associated with the first routing node name.

30. The system of claim 16 further comprising a route table for storing at least some of the contents of the informational message, the contents of the route table being initially determined by an initialization file and being updated in response to a plurality of informational messages received in response to at least one of a time period expiration and an event.

* * * * *